United States Patent Office 3,644,578
Patented Feb. 22, 1972

3,644,578
CROSS-LINKABLE COMPOSITIONS BASED ON ELASTOMERS AND ON CROSS-LINKABLE COPOLYMERS OF VINYL CHLORIDE
Alexis Mathieu, Brussels, Belgium, and Claude Barberot, Paris, France, assignors to Solvay & Cie, Rue du Prince Albert, Brussels, Belgium
No Drawing. Filed Apr. 28, 1969, Ser. No. 819,988
Claims priority, application France, Apr. 30, 1968, 150,080
Int. Cl. C08f 29/24, 37/18
U.S. Cl. 260—876 R
19 Claims

ABSTRACT OF THE DISCLOSURE

The cross-linkable composition contains from 95 to 20% by weight of one or more elastomers and 5 to 80% by weight of a cross-linkable vinyl polymer based on vinyl chloride. The cross-linkable vinyl polymer is obtained by polymerization of 3 to 50 parts by weight of a mixture of a diolefin and one or more monomers chosen from the nitriles and esters of unsaturated monocarboxylic acid and unsaturated polycarboxylic acid, in the presence of 100 parts of by weight of a copolymer of vinyl chloride and a monomer containing at least 8 carbon atoms and which is a vinyl ester of a monocarboxylic acid, an ester of an unsaturated mono- or polycarboxylic acid or an alkyl vinyl ether. The present cross-linkable compositions possess a highly useful combination of characteristics including excellent mechanical properties which are retained at high temperature, facility of application at low temperatures, resistance to abrasion, chemical agent and low temperature; nonflammability, high thermal stability and good dielectric properties.

BACKGROUND OF THE INVENTION

The present invention relates to new cross-linkable compositions based on elastomers and on cross-linkable copolymers of vinyl chloride which are particularly easy to apply.

The resinous compositions of the present invention are suitable, in a general fashion, for all applications in which rubber-like elastomers are commonly employed, notably for those which require excellent resistance to creep at high temperatures, very good mechanical properties, and exceptional resistance to flames and to chemical materials.

The problem presented by the incompatibility of elastomers with vinyl polymers, and particularly with polyvinyl chloride, is not new.

Different means have been proposed to improve the compatibility of the two resins with each other, and notably, to carry out a pretreatment of the elastomer, in order to make it more plastic (denervation) and then incorporate it in the polyvinyl chloride by means of a long and laborious kneading process.

However, with the exception of mixtures of polyvinyl chloride and butadiene-acrylonitrile copolymers, the numerous studies undertaken in this area have not led to results that can be put to industrial use; the failure being due principally to the fact that the operation is very difficult to carry out, and consequently the mixtures obtained do not exhibit properties that are superior to those of the two resins taken separately.

On the other hand, the mixtures obtained from an elastomer and a vinyl resin do not provide sufficiently efficacious and rapid cross-linking to permit their use in certain applications.

SUMMARY OF THE INVENTION

It has been found that by using, in the place of the polymers of vinyl chloride, cross-linkable copolymers of vinyl chloride such as those described in copending U.S. patent application 659,849, filed Aug. 11, 1967, and which have an exceptionally high degree of compatibility with the elastomers, that homogeneous compositions which are totally cross-linked are obtained, which exhibit a highly advantageous set of characteristics not previously obtained by mixing an elastomer with a polymer of vinyl chloride.

According to the present invention, cross-linkable compositions are provided which have excellent mechanical properties which are retained even after exposure to high temperature. The new cross-linkable compositions also possess excellent resistance to abrasion, to fire, to low temperatures and to chemical agents, and in addition have good dielectric properties, high thermal stability and are easy to use even at low temperature. The new cross-linkable compositions provided by the invention contain between 95 and 20% by weight of one or more elastomers, and 5 to 80% by weight of a vinyl chloride based, cross-linkable copolymer obtained through the polymerization of 3 to 50 parts by weight of a mixture of a diolefin and one or more monomers chosen from among the nitriles and esters of unsaturated mono- and polycarboxylic acids, in the presence of 100 parts by weight of a copolymer of vinyl chloride with a monomer containing at least 8 carbon atoms selected from the group comprising the vinyl esters of monocarboxylic acids, the esters of unsaturated mono- and polycarboxylic acid and the alkyl vinyl ethers.

DESCRIPTION OF PREFERRED EMBODIMENTS

The group of elastomers which are preferentially used in the present invention comprises the rubber-like polymers and copolymers of diolefins such as butadiene, polyisoprene, butyl rubber, polychloroprene, etc., the polymers and copolymers of olefins which may or may not be modified with unsaturated products, and in particular the ethylene-vinyl acetate copolymers, the ethylene-propylene copolymers, the ethylene-propylene-diene terpolymers (whether or not the diene is conjugated), the halogenated polyethylenes, and in particular the chlorinated and chlorosulfonated polyethylenes.

The composition of the above-mentioned resins is not a critical factor, as long as one has to do with elastomers.

Of the copolymers and terpolymers of ethylene and propylene, the most interesting are those exhibiting a Moony viscosity of between 40 and 95 at 100° C. (ASTM test D 927/53T), and a propylene content of between 15 and 45 mole percent.

The nonconjugated dienes combined with ethylene and propylene in the above mentioned terpolymers are preferentially chosen from among the following groups: The nonconjugated aliphatic dienes such as pentadiene-1,4, hexadiene-1,4 and hexadiene-1,5; the nonconjugated monocyclic dienes such as 4-vinylcyclohexene, 1,3-divinylcyclohexane, cycloheptadiene-1,4 and cyclooctadiene-1,5; the nonconjugated alicyclic dienes possessing an endocyclic bridge such as dicyclopentadiene, norbornadiene, methylene norbornene, ethylidene norbornene and tetrahydroindene.

The cross-linkable copolymers of vinyl chloride used in the present invention are those described in U.S. patent application 659,849. These cross-linkable copolymers are obtained by first preparing a suitably internally plasticized vinyl chloride copolymer and then modifying this copolymer to yield a cross-linkable composition.

To prepare the internally plasticized vinyl chloride used for the present cross-linkable copolymers, vinyl chloride is copolymerized with a monomer containing at least 8 carbon atoms. These monomers may be vinyl esters of monocarboxylic acids containing at least 6 carbon atoms and preferably more than 10 carbon atoms in the acid radical, such as vinyl laurate, palmitate and stearate; esters of unsaturated mono- or polycarboxylic acids, especially alkyl maleates, fumarates, acrylates and methacrylates and even more preferably those having an alkyl chain of 6 to 12 carbon atoms such as octyl fumarate and maleate and ethylhexyl acrylate, and alkylvinyl ethers, preferably those in which the alkyl chain has 12 to 18 carbon atoms and most preferably cetyl-vinyl ether.

The weight ratio of the vinyl chloride to the plasticizing comonomer is preferably in the range of 95:5 to 75:25.

The copolymerization involved is a conventional addition polymerization and, accordingly, can be effected by any know means. It is preferred, however, to conduct the copolymerization in an aqueous suspension at a temperature of from 40 to 70° C. in the presence of an initiator soluble in the monomers. Preferred initiators are organic peroxides, particularly lauroyl peroxide, 2,4-dichlorbenzoyl peroxide, and acetylcyclohexanesulfonyl peroxide as well as the peroxydicarbonates.

As usual in addition polymerization in aqueous suspension, a dispersing agent is employed. In this case, the dispersing agent is preferably one which favors porosity of the vinyl chloride copolymers being formed. Examples of such dispersing agents are copolymers of vinylpyrrolidone with an alkyl acrylate, the alkyl group of which contains at least 6 carbon atoms, mixtures of polyvinyl alcohol and one or more products resulting from the condensation of a polyoxyalkylene glycol with a polyamine, partially esterified styrene-maleic anhydride copolymers as well as polyvinyl alcohols with a low degree of hydrolysis.

The resultant vinyl chloride copolymer is then modified by the polymerization of a mixture of a diolefin and one or more monomers of the group consisting of nitriles and esters of unsaturated mono- or polycarboxylic acids in the presence of the vinyl chloride copolymer. The diolefin is preferably butadiene, dichlorobutadiene or isoprene. The other monomer or monomers are preferably acrylonitrile, fumaronitrile, methacrylonitrile or lower alkyl acrylates or methacrylates in which the alkyl group contains from 1 to 4 carbon atoms.

The amount of the mixture of the modifying monomers employed is from 3 to 50 parts by weight and preferably from 5 to 25 parts by weight per 100 parts by weight of the vinyl chloride copolymer. The proportion of the diolefin in the mixture of modifying monomers is from 10 to 99%.

The procedure used for the polymerization of the modifying monomers in the presence of the copolymer with internal plasticization is not of primary importance for obtaining the cross-linkable copolymer of vinyl chloride employed in the present invention. The method used may be a suspension, an emulsion or a bulk polymerization process.

The compositions of the present invention may also contain variable proportions of miscellaneous ingredients, selected as a function of the characteristics required for the various applications under consideration; in particular, they may contain plasticizers, various stabilizers, lubricants, fillers, pigments, colorants and fungicides.

The plasticizers incorporated in the compositions prepared according to the present invention are preferentially selected from the following groups: Phthalic esters such as the octyl phthalates, di-2-ethylhexyl- and isooctyl phthalates and didecyl phthalate; phosphoric esters, such as triaryl, trialkyl and arylalkyl phosphates; chlorinated aliphatic and aromatic compounds such as chlorinated paraffins and chlorinated diphenyls; the simple or mixed esters of adipic, azaleic, citric, sebacic acid, such as octyl adipate and octyl sebacate; and the macromolecular plasticizers such as the linear polyesters.

Used preferentially are the compounds having a low volatility, called "high-temperature plasticizers," and particularly the trimellitates, the esters of pentaerythritol, and di-tridecyl phthalate.

The stabilizers added to the compositions of the present invention may be: Metallic salts such as sodium, calcium and basic lead salts, and preferentially the silicates, carbonates, phthalates and phosphites; the metal derivatives of fatty acids such as lead, cadmium, barium, trontium and tin salts of fatty acids; the epoxidized vegetable oils and the antioxidants such as the mono- and polyphenols.

It is also possible to incorporate the additives commonly used in the formulations of rubber-like compositions, particularly the antioxidants and antiozonants such as amines, aminoaldehydes, aminoketones and hydroxylated aromatic compounds; plasticizers, in particular the derivatives of phthalic, sebacic and adipic acid; reinforcing or inert fillers such as carbon black, zinc oxide, chalk, talc, etc., the aliphatic, naphthenic or aromatic mineral oils.

These additives are incorporated in the compositions of the invention prior to their cross-linking.

The compositions of the present invention may be put to use by all the appropriate methods known in the art, for example by kneading with an internal kneader or a kneader with cylinders.

The temperature of use of the compositions of the present invention is comprised preferentially between 80° and 120° C., while if polyvinyl chloride is used, the temperature of use must be above 140° C.

The compositions of the present invention may be cross-linked by means of the usual agents used for the vulcanization of rubbers, especially by sulfur, which may be admixed with accelerators such as tetramethyl thiuram disulfide, 2-mercaptobenzothiazol, bis-4-ethylthiazol disulfide, as well as by means of organic peroxides to which polyfunctional agents may or may not be added.

The organic peroxides used comprise, generally speaking, all the peroxides whose decomposition temperature is above 130° C., particularly dicumyl peroxide, 2,5-dimethyl-2,5-di(tert.-butylperoxy)hexane, 2,5 - dimethyl-2,5-di(tert.-butylperoxy)hexyne, di-tert.-butyl peroxide, di-tert.-butyl hydroperoxide, as well as $\alpha,\alpha'$-(tert.-butylperoxy)diisopropylbenzene.

The systems composed of organic peroxides and polyfunctional agents comprise the above mentioned organic peroxides in combination with one or several polyfunctional agents, preferentially triallyl cyanurate, diallyl phthalate, the maleimides, and in particular the bis-maleimides, divinylbenzene, tetraalyloxyethane, etc.

Expediently, 0.5 to 10 g. of one or several cross-linking agents are used per 100 g. of product.

The compositions of the present invention generally exhibit excellent properties. Among their most outstanding characteristics may be listed their good mechanical properties and notably the high breaking strength and elongation at rupture, as well as an increased resistance to deformation under stress. A decrease and even disappearance of creep at high temperatures is noted. In addition, the obtained compositions retain their initial mechanical properties even after prolonged exposure to high temperatures.

The products of the present invention are also distinguished by their excellent resistance to abrasion, to low temperatures, and especially to chemical agents; by their noninflammability, their good dielectric properties, their high thermal stability, their rapid and total cross-linking, as well as by their facility of application at low temperatures.

The above mentioned characteristics and the rather low cost price of the compositions of the invention predict a great future for these materials.

One field of application of the compositions of the present invention is cable making, especially in the manufacture of insulating covers or protective sheathings for electric cables; as well as the manufacture of joints, tubes and pipes used for the transportation of chemical products.

The following examples further illustrate the best mode currently contemplated for carrying out the present invention, but must not be construed as limiting the invention in any manner whatsoever. Examples 1, 3, 5, 8–10, 12 and 13 illustrate the invention and Examples 2C, 4C, 6C, 7C and 11C are comparative examples.

EXAMPLES 1 AND 2C

A mixture is prepared, partly by kneading, from 55 parts of a butadiene-acrylonitrile copolymer containing 33% acrylonitrile by weight, and 45 parts of a cross-linkable copolymer of vinyl chloride obtained by the polymerization of butadiene and methyl methacrylate in the presence of a vinyl chloride-vinyl stearate copolymer, according to the technique described below.

Into an autoclave of 5 liters capacity, 2,500 g. of distilled water, 4 g. of polyvinyl alcohol, 4 g. of lauroyl peroxide and 200 g. of vinyl stearate are introduced.

The autoclave is evacuated by means of a vacuum pump in order to eliminate the greater part of the oxygen present.

Then 800 g. of vinyl chloride are added, and the temperature inside the autoclave is increased to 60° C. while stirring the reagents at constant speed.

After 12 hours of reaction, the conversion of the monomer is about 90% complete. After degassing the unreacted monomers, 50 g. of methyl methacrylate, 50 g. of butadiene and 2 g. of lauroyl peroxide are introduced.

The temperature is increased to 80° C. and the polymerization is continued for another 2 hours.

The resulting resin is washed and then dried to constant weight in a ventilated oven of 50° C.

In a parallel experiment undertaken for comparative purposes, a mixture of 60 parts of the above mentioned butadiene-acrylonitrile copolymer and 40 parts of a polyvinyl chloride having a K value of 65, is prepared together with the various ingredients shown in Table 1.

The mixture containing polyvinyl chloride is cross-linked for 30 minutes at 160° C. by means of a system consisting of 2.25 parts of a zinc salt of 2-mercaptobenzothiazol, 1.25 parts of benzothiazyl disulfide and 1 part of sulfur.

As for the mixture containing the cross-linkable copolymer of vinyl chloride, it is cross-linked by means of a system composed of 3 parts of an organic peroxide and 1.5 parts of triallyl cyanurate.

The following properties are determined for the products resulting from Example 1 and Example 2C, the latter being a comparative example.

Crushing strength at 200° C., using the following method: To a 1 cm.$^2$ section of an approximately 2 mm. thick plate, pressures of 5–7, 5–10 and 12 bars are applied at 200° C. for 5 minutes. Thereupon the extent of deformation, expressed in percent of the initial thickness, is measured.

Tensile modulus at 20° C. and 180° C., at a rate of separation of the grips of 500 mm./min., as described in ASTM D 412.

The results of these tests are listed in Table 1 below.

TABLE 1

| Example | 1 | 2C |
|---|---|---|
| Composition, grams: | | |
| Butadiene-acrylonitrile copolymer | 55 | 60 |
| Polyvinyl chloride | | 40 |
| Cross-linkable copolymer of vinyl chloride | 45 | |
| Dibasic lead phthalate | 2 | 2 |
| Dioctyl phthalate | 27 | 27 |
| Calcium carbonate BSH | 30 | 30 |
| Carbon black | 20 | 20 |
| Silica | 10 | 10 |
| Zinc oxide | 3 | 3 |
| Stearic acid | 1 | 1 |
| Paraffin | 1 | 1 |
| Properties; | | |
| Crushing resistance at 200° C.; percent of deformation at a pressure of: | | |
| 5 bars | 10 | 17 |
| 7.5 bars | 19 | 36 |
| 10 bars | 27 | 51 |
| 12 bars | 32 | 65 |
| Tensile modulus at 20° C. in Newtons at: | | |
| 100% elongation | 330 | 240 |
| 200% elongation | 600 | 350 |
| 300% elongation | 1,100 | 500 |
| Tensile modulus at 180° C. in Newtons at: | | |
| 20% elongation | 65 | 22 |
| 40% elongation | 110 | 37 |
| 60% elongation | 150 | 48 |

The results of the tests listed above show the good mechanical characteristics, and the high creep resistance at high temperature, of the compositions of the present invention, compared with a mixture comprising a butadiene-acrylonitrile copolymer and polyvinyl chloride.

It should be stressed that the use of a cross-linkable copolymer of vinyl chloride makes it possible to prepare mixtures containing more than 40% of copolymer, while in the case when polyvinyl chloride is used, the incorporation of more than 40% polyvinyl chloride leads to products whose general properties at high temperatures, and whose elasticity, decrease in an irreversible manner.

Furthermore, the resistance of the composition of Example 1 to ozone was measured according to the method given in UTE C 32 100 (temperature: 50° C.; 0.2% ozone). After 500 hours, no deterioration or cracking of the sample was observed.

EXAMPLES 3 AND 4C

A mixture of 70 parts of a terpolymer based on ethylene and propylene, having a Mooney viscosity ML (1+8)/mm. of 95 at 100° C. (measured according to ASTM D 927/53 T) and sold commercially under the name Vistalon 3509 (Esso), and 30 parts of a cross-linkable copolymer of vinyl chloride obtained by polymerization of butadiene and methacrylate in the presence of a vinyl chloride/vinyl stearate copolymer according to the technique and in the proportions indicated in Example 1 is prepared by kneading in Example 3.

For comparison, in Example 4C the same mixture is prepared as described above, except that the cross-linkable copolymer of vinyl chloride is replaced by a polyvinyl chloride having a K value of 65.

After adding all the ingredients listed in Table 1 for Examples 1 and 2C, the compositions are cross-linked by means of the technique described in Examples 1 and 2C above.

Thereupon the following properties are determined:

Resistance to the propagation [sic] of a flame, according to the test conditions contained in paragraph 3–3–7–5 of UTE NF C 32 200. In the case of a composition containing a terpolymer only, the combustion of the sample is complete after the second application of the flame.

As for the mixture containing a terpolymer and a cross-linkable polymer of vinyl chloride, the sample is extinguished almost immediately after the fifth and last application of the flame.

Resistance to oils, according to the following method:

The sample is immersed in oil at 70° C. and subjected to the ASTM No. 2 test; then the comparative weight and hardness changes are measured.

The results of these tests are listed in Table 2 below.

TABLE 2

| Example | 3 | 4C |
|---|---|---|
| Composition grams: | | |
| Terpolymer (Vistalon 3509) | 70 | 70 |
| Cross-linkable copolymer of vinyl chloride | 30 | |
| Polyvinyl chloride | | 30 |
| Change in weight: | | |
| Duration of immersion in oil at 70° C.; percent at: | | |
| 24 hours | +0.8 | +20 |
| 48 hours | +1.3 | +28 |
| 96 hours | +1.7 | +42 |
| 144 hours | +2.5 | +50 |
| 192 hours | +3 | +56 |
| 240 hours | +3.3 | +60 |
| Change in Shore A Hardness: | | |
| Duration of immersion in oil at 70° C.; percent at: | | |
| 24 hours | +8 | −22 |
| 48 hours | +9 | −30 |
| 96 hours | +11 | −35 |
| 144 hours | +11 | −44 |
| 192 hours | +12 | −45 |
| 240 hours | +17 | −47 |

The results of the tests listed above with respect to Example 3 clearly show the exceptional resistance of the compositions of the present invention to the propagation of a flame and to chemical agents, while it is well known that the cross-linked mixtures based on olefin polymers or copolymers (whether or not modified) possess a mediocre resistance to the propagation of a flame and to chemical products.

The addition of polyvinyl chloride as shown by tests of comparative Example 4C brings about only a very slight improvement in these properties. Moreover, the mixtures comprising polyvinyl chloride are difficult to employ due to the incompatibility of the two resins, and the cross-linking is slow and incomplete because only sulfur-based cross-linking agents can be used due to the fact that systems based on organic peroxides degrade the polyvinyl chloride.

EXAMPLES 5 AND 6C

A chlorinated polyethylene sold under the name PLASKON CPE 500 (Allied Chem.) is mixed, by kneading, with polyvinyl chloride (K=65) in Example 6C, and with the cross-linkable copolymer of vinyl chloride described in Example 1, in Example 5 as well as with the various ingredients listed in Table 3 below.

Then the following properties of the obtained cross-linked compositions are determined: Tension and elongation at break, according to ASTM test D 412; crushing resistance at 200° C., according to the following method: A load of 5 kg. is applied for 8 minutes to a 1 cm.² section of an approximately 2 mm. thick plate at 200° C. Then the percentage of deformation (crushing) is measured: this value should be less than or equal to 40.

Two minutes and 10 minutes after the above test, the residual percent deformation (remanent deformation) is measured: this value indicates the elastic recovery of the material.

TABLE 3

| Example | 5 | 6C |
|---|---|---|
| Composition, grams: | | |
| Chlorinated polyethylene (Plaskon CPE 500) | 39 | 39 |
| Cross-linkable copolymer of vinyl chloride | 23.4 | |
| Polyvinyl chloride | | 23.4 |
| Dibasic lead phthalate | 4.7 | 4.7 |
| Antimony oxide | 15.5 | 15.5 |
| Monobasic lead stearate | 0.4 | 0.4 |
| Carbon black | 7.7 | 7.7 |
| Dioctyl phthalate | 7.8 | 7.8 |
| α′,α′-bis(tert.-butylperoxy)-p-diisopropyl-benzene Peroxymon F 40) | 0.75 | 0.75 |
| Triallyl cyanurate | 0.75 | 0.75 |
| Properties: | | |
| Tensile strength, kg./cm.² | 243 | 164 |
| Elongation at rupture, percent | 320 | 325 |
| Deformation, percent | 15–16 | 15–16 |
| Residual deformation, percent: | | |
| After 2 minutes | 1.5 | 3.2 |
| After 10 minutes | 0.5 | 1.8 |

The results of the above tests show that the excellent mechanical properties of the mixtures based on chlorinated polyethylene and polyvinyl chloride are retained, and some even improved, in the case of the compositions of the present invention as illustrated in Example 5.

However, the mixtures based on chlorinated polyethylene and polyvinyl chloride are difficult to prepare, and the cross-linking of these mixtures is mediocre.

It should be observed that in the case of the compositions of the present invention the products are easy to apply, and the cross-linking of the mixtures is total and rapid.

EXAMPLES 7C AND 8 TO 10

The mixtures listed in Table 4 are prepared by kneading.

The chlorosulfonated polyethylene employed is sold commercially under the name Hypalon 40 (Du Pont).

The cross-linkable copolymer of vinyl chloride employed is that used in Example 1.

The compositions are cross-linked by means of a system composed of 2.25 parts of a zinc salt of 2-mercaptobenzothiazole, 1.25 parts of benzothiazyl disulfide, and 1 part of sulfur.

For the resulting compositions, the tensile moduli are determined at 20° C. at a rate of separation of 500 mm./minute, according to ASTM standard D 412, and the volume resistivity is determined according to ASTM standard D 257.

The results of these tests are listed in Table 4 below.

TABLE 4

| Example | 7C | 8 | 9 | 10 |
|---|---|---|---|---|
| Composition, grams: | | | | |
| Chlorosulfonated polyethylene (Hypalon 40) | 100 | 90 | 80 | 70 |
| Cross-linkable copolymer of vinyl chloride | | 10 | 20 | 30 |
| Properties: | | | | |
| Tensile modulus at 20° C. in Newtons: | | | | |
| At 10% elongation | | 10 | 13 | 14 |
| At 20% elongation | | 15 | 19 | 22 |
| At 50% elongation | | 33 | 42 | 45 |
| At 100% elongation | | 56 | 68 | 70 |
| Volume resistivity, ohm. cm.²/cm | $2.8 \times 10^{11}$ | | | $2.7 \times 10^{12}$ |

The figures indicate the good mechanical characteristics of the compositions of the invention, which are the only ones satisfying the standards of the test listed in Table 4 above, namely a minimum value of the tensile modulus of 40 newtons at 50% elongation.

Moreover it is noted that the electric resistivity is improved by a factor of 10.

On the other hand it must be underlined that a method is known in the art for improving the tensile moduli of chlorosulfonated polyethylene at low elongations, through the addition of polyvinyl chloride. However, at the present time it is difficult if not impossible to incorporate more than 10% of polyvinyl chloride because, in order to obtain a good dispersion of the polyvinyl chloride, it is necessary to work at temperature above 140° C., the temperature above which the chlorosulfonated polyethylene decomposes in the mixer. This disadvantage does not exist in the case of the cross-linkable polymers of vinyl chloride which permit lower temperatures of application.

EXAMPLES 11C, 12 and 13

Compositions containing several elastomers, to which a cross-linkable polymer of vinyl chloride may or may not be admixed, are prepared by kneading.

The chlorosulfonated polyethylene is sold commercially under the name Hypalon 40 (Du Pont).

The butadiene-acrylonitrile copolymer contains 33% acrylonitrile.

The cross-linkable copolymer of vinyl chloride is that used and described in Examples 1 and 2.

The following properties are determined for the compositions described in Table 5 below:

Resistance to solvents, using the following method:

The sample is immersed in white spirit at 50° C. for 14 days and the change in weight is measured.

Volume resistivity, according to ASTM standard D 257.

TABLE 5

| Example | 11C | 12 | 13 |
|---|---|---|---|
| Composition, grams: | | | |
| Chlorosulfonated polyethylene | 100 | 80 | 70 |
| Butadiene-acrylonitrile copolymer | | 10 | 15 |
| Cross-linkable copolymer of vinyl chloride | | 10 | 15 |
| Properties: | | | |
| Resistance to solvent, weight change, percent | 12 | 6 | |
| Volume resistivity, ohm. cm.$^2$/cm | $2.8 \times 10^{11}$ | | $2.9 \times 10^{12}$ |

The results of the tests listed above clearly show the greater resistance of the compositions of the invention to solvents than that exhibited by the chlorosulfonated polyethylene.

Moreover, the resistivity is improved by a factor of 10.

In addition, the resistance to the nonpropagation of a flame according to the test conditions contained in paragraph 3-3-7-5 of UTE standard NF C 32 200 have been measured. In the case of the compositions of Examples 12 and 13, the sample is extinguished almost immediately after the fifth and last application of the flame.

What we claim and desire to secure by Letters Patent is:

1. Plastic cross-linkable compositions constituted of a cross-linkable copolymer of vinyl chloride and at least one elastomer which comprises
    95 to 20% by weight of at least one elastomer selected from a member of the group consisting of the rubber-like ethylene/propylene copolymers and ethylene/propylene/diene terpolymers having a Mooney viscosity of about 40 to 95 at 100° C., according to ASTM Test D 927/53T and a propylene content of about 15 to 45 mole percent, and
    5 to 80% by weight of a cross-linkable copolymer of vinyl chloride obtained by polymerization of
    3 to 50 parts by weight of a mixture of a conjugated diolefin and at least one monomer selected from the group consisting of a nitrile and an ester of an unsaturated monocarboxylic acid and an unsaturated polycarboxylic acid, in the presence of
    100 parts by weight of a copolymer of vinyl chloride and an internally plasticizing comonomer containing at least 8 carbon atoms, said comonomer being selected from a member of the group consisting of a vinyl ester of a monocarboxylic acid, an ester of an unsaturated monocarboxylic acid, an ester of a polycarboxylic acid, and an alkyl vinyl ether.

2. Plastic cross-linkable composition according to claim 1 in which said elastomer is a rubber-like ethylene/propylene terpolymer of a conjugated diene.

3. Plastic cross-linkable composition according to claim 1 in which said elastomer is an ethylene/propylene/butadiene terpolymer.

4. Plastic cross-linkable composition according to claim 1 in which said elastomer is an ethylene/propylene/nonconjugated diene terpolymer.

5. Plastic cross-linkable composition according to claim 1 in which said elastomer is an ethylene/propylene copolymer.

6. Plastic cross-linkable composition according to claim 1 in which said cross-linkable copolymer is obtained by polymerization of said diolefin and said monomer in the presence of said copolymer of vinyl chloride by means of a suspension polymerization procedure.

7. Plastic cross-linkable composition according to claim 1 in which said cross-linkable copolymer is obtained by polymerization of said diolefin and said monomer in the presence of said copolymer of vinyl chloride by means of an emulsion polymerization procedure.

8. Plastic cross-linkable composition according to claim 1 in which said cross-linkable copolymer is obtained by polymerization of said diolefin and said monomer in the presence of said copolymer of vinyl chloride by means of a bulk polymerization procedure.

9. Plastic cross-linkable composition according to claim 1 in which said diolefin used for the preparation of the cross-linkable copolymer is chosen from a member of the group consisting of butadiene, 2-chlorobutadiene and isoprene.

10. Plastic cross-linkable composition according to claim 1 in which said nitrile of said unsaturated mono- and polycarboxylic acids used for the preparation of the cross-linkable copolymer is chosen from a member of the group consisting of acrylonitrile, fumaronitrile and methacrylonitrile.

11. Plastic cross-linkable composition according to claim 1 in which said ester of an unsaturated mono- and polycarboxylic acids used in combination with said diolefin during the preparation of the cross-linkable polymer is chosen from a member of the group consisting of a lower-alkyl ester of acrylic acid and methacrylic acid, in which the alkyl group contains 1 to 4 carbon atoms.

12. Plastic cross-linkable composition according to claim 1 in which said vinyl ester of a monocarboxylic acid containing at least 6 carbon atoms, which is copolymerized with the vinyl chloride during the preparation of the cross-linkable copolymer of vinyl chloride is selected from a member of the group consisting of vinyl laurate, vinyl palmitate and vinyl stearate.

13. Plastic cross-linkable composition according to claim 1 in which said ester of said unsaturated mono- and polycarboxylic acids which is copolymerized with vinyl chloride for the preparation of the cross-linkable copolymer is chosen from the group of higher alkyl maleates, fumarates, acrylates and methacrylates in which the alkyl group contains 6 to 12 carbons.

14. Plastic cross-linkable composition according to claim 1 in which said alkyl vinyl ether which is copolymerized with vinyl chloride for the preparation of said cross-linkable copolymer is cetyl vinyl ether.

15. Composition according to claim 1 cross-linked by means of a sulphur-based rubber vulcanization system, optionally containing vulcanization accelerators.

16. Composition according to claim 1 cross-linked by means of organic peroxides having a decomposition temperature above 130° C. optionally containing a polyfunctional cross-linking agent.

17. As a new industrial product, an article comprised of the composition defined in according to claim 1 which has been subjected to a cross-linking treatment.

18. As a new industrial product, insulating covering comprised of the composition defined in claim 1 which has been subjected to a cross-linking treatment.

19. As a new industrial product, a protective sheath comprised of the composition defined in claim 1 which has been subjected to a cross-linking treatment.

References Cited

UNITED STATES PATENTS

| 3,281,345 | 10/1966 | Kuhne | 260—879 |
| 3,475,361 | 10/1969 | Garner | 260—876 X |

FOREIGN PATENTS

| 1,496,772 | 8/1967 | France | 260—879 |
| 731,243 | 3/1966 | Canada | 260—879 |
| 932,852 | 7/1963 | Great Britain | 260—876 |
| 1,093,974 | 12/1967 | Great Britain | 260—879 |

MURRAY TILLMAN, Primary Examiner

H. ROBERTS, Assistant Examiner

U.S. Cl. X.R.

260—23.7 H, 30.6 R, 31.6, 31.8 N, 33.6 UA, 33.8 UA, 41.5 R, 45.7 PR, 45.75 R, 45.85, 45.9 R, 45.95, 879